United States Patent
Moeller

(10) Patent No.: US 12,221,954 B2
(45) Date of Patent: Feb. 11, 2025

(54) WIND TURBINE THERMAL ASSEMBLY

(71) Applicant: Siemens Gamesa Renewable Energy A/S, Brande (DK)

(72) Inventor: Henrik Braamunk Moeller, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 203 days.

(21) Appl. No.: 17/908,667

(22) PCT Filed: Mar. 3, 2021

(86) PCT No.: PCT/EP2021/055244
§ 371 (c)(1),
(2) Date: Sep. 1, 2022

(87) PCT Pub. No.: WO2021/180525
PCT Pub. Date: Sep. 16, 2021

(65) Prior Publication Data
US 2023/0160371 A1    May 25, 2023

(30) Foreign Application Priority Data
Mar. 10, 2020    (EP) .................................... 20162070

(51) Int. Cl.
*F03D 80/60* (2016.01)
(52) U.S. Cl.
CPC .......... *F03D 80/60* (2016.05); *F05B 2260/20* (2013.01)

(58) Field of Classification Search
CPC . F03D 80/60; F03D 7/00; F03D 11/00; F05B 2270/303; F05B 2270/337;
(Continued)

(56) References Cited

U.S. PATENT DOCUMENTS

2009/0206603 A1    8/2009    Llorente Gonzalez
2012/0156053 A1    6/2012    Stiesdal
(Continued)

FOREIGN PATENT DOCUMENTS

AU    2013301472 A1    3/2015
CN    202579041 U    12/2012
(Continued)

OTHER PUBLICATIONS

International Search Report and Written Opinion for PCT/EP2021/055244, issued on May 31, 2021.

*Primary Examiner* — Harry E Arant
(74) *Attorney, Agent, or Firm* — Schmeiser, Olsen & Watts LLP

(57) ABSTRACT

A thermal assembly of a wind turbine is provided, including an external liquid-to-air heat exchanger arranged to lower the temperature of a liquid coolant in a coolant circuit which coolant circuit is arranged to convey the liquid coolant to a number of heat-dissipating components during operation of the wind turbine; and a thermal assembly control arrangement realized to exclude the external liquid-to-air heat exchanger from the coolant circuit during an off-grid mode of the wind turbine. Also provided is a method of operating a wind turbine in an off-grid mode, the wind turbine including an embodiment of such a thermal assembly.

15 Claims, 6 Drawing Sheets

(58) Field of Classification Search
CPC ........... F05B 2270/107; F05B 2260/20; Y02E 10/72; F03B 11/00
See application file for complete search history.

(56) References Cited

U.S. PATENT DOCUMENTS

2012/0308383 A1   12/2012  Sabhapathy
2013/0056989 A1    3/2013  Sabhapathy

FOREIGN PATENT DOCUMENTS

| | | | | |
|---|---|---|---|---|
| CN | 103925629 A | | 7/2014 | |
| CN | 105927484 A | | 9/2016 | |
| CN | 106523282 A | * | 3/2017 | |
| CN | 106706353 A | | 5/2017 | |
| CN | 106 523 282 B | | 4/2019 | |
| GB | 2 505 470 A | | 3/2014 | |
| GB | 2510824 A | * | 8/2014 | ............. F01M 5/005 |

* cited by examiner

WIND TURBINE THERMAL ASSEMBLY

CROSS-REFERENCE TO RELATED APPLICATIONS

This application claims priority to PCT Application No. PCT/EP2021/055244, having a filing date of Mar. 3, 2021, which claims priority to EP Application No. 20162070.5, having a filing date of Mar. 10, 2020, the entire contents both of which are hereby incorporated by reference.

FIELD OF TECHNOLOGY

The following describes a thermal assembly of a wind turbine, and a method of operating a wind turbine in an off-grid mode.

BACKGROUND

The purpose of a wind turbine is to convert kinetic energy from the wind into electrical power, which is usually exported to a grid. For a wind turbine to be able to generate electricity, the wind speed must exceed a certain threshold.

A wind turbine may be disconnected from the grid for several reasons, or may be in a mode of operation in which it remains connected to the grid but does not export electricity. The duration of such an "off-grid" state can vary, for example from several hours to several days, depending on the reason for the disconnection.

A problem faced by wind turbine operators is that damage to various components can arise when a wind turbine is off-grid. This is because the temperature in the nacelle can drop to very low levels, and the relative humidity increases accordingly. Condensation on electrical components can lead to corrosion damage.

One way of addressing this problem is to provide heaters that are run off a separate back-up power supply, for example from a battery that is charged during normal operation of the wind turbine, or from a diesel generator. However, this approach is also associated with problems, for example it is expensive to provide a large-capacity battery. In the case of an offshore wind park, it is expensive to ensure that each wind turbine has a sufficient supply of diesel. Furthermore, in each case it is not possible to guarantee that the power supply will last until the off-grid situation has been resolved.

SUMMARY

An aspect relates to an improved way of operating a wind turbine during an off-grid state. According to embodiments of the invention, the wind turbine thermal assembly comprises a liquid-to-air heat exchanger arranged to lower the temperature of a liquid coolant in a coolant circuit that is arranged to convey the liquid coolant to a number of heat-dissipating components during operation of the wind turbine. The inventive thermal assembly further comprises a thermal assembly control arrangement realized to exclude the heat exchanger from the coolant circuit during an off-grid mode of the wind turbine. An off-grid mode shall be understood to mean a mode of operation in which the wind turbine is not exporting electricity to the grid. By excluding the heat exchanger, the inventive thermal assembly ensures that heat from the components is stored in the liquid coolant, since the temperature of the liquid coolant will gradually rise in the absence of active cooling from the heat exchanger.

According to embodiments of the invention, a wind turbine comprising an embodiment of the inventive thermal assembly is operated in an off-grid mode by carrying out the steps of: storing thermal energy dissipated by the number of heat-dissipating components during a first off-grid mode during which the wind turbine is operated to generate power for its own consumption; and releasing the stored thermal energy to the nacelle interior during a second off-grid mode during which the wind turbine does not generate power.

An advantage of the inventive thermal assembly and wind turbine operating method is that a wind turbine can better "survive" an off-grid state by maintaining environmental conditions inside the nacelle. If the off-grid duration was not too long, the environment inside the nacelle may fulfil the conditions for re-connect. Such conditions may include the relative humidity and temperature in the nacelle interior, for example. It follows that the wind turbine can be re-connected to the grid with less delay, with a favorable effect on the productivity of that wind turbine.

Embodiments and features of the invention are given by the dependent claims, as revealed in the following description. Features of different claim categories may be combined as appropriate to give further embodiments not described herein.

In the context of embodiments of the invention, it shall be understood that a liquid coolant circuit comprises a pump that causes the liquid coolant to circulate in a system of ducts or hoses. It may also be assumed that such ducts or hoses are laid in close proximity to heat-dissipating components such as a power converter, transformer, generator, etc. The skilled person will be aware of the manner in which a liquid coolant circuit is incorporated in a wind turbine design, and such details need not be discussed here in detail.

In the following, it may be assumed that the wind turbine comprises a liquid cooling system in which a liquid coolant is used to draw heat from various components of the wind turbine during operation, and an active cooling arrangement such as an external heat exchanger. This can extend to the nacelle exterior so that air passing over the heat exchanger acts to lower the temperature of the warm coolant. Usually, such a heat exchanger is constructed to have an enlarged surface area—for example by including fins or lamellae to increase the rate of heat transfer to the air. Such a heat exchanger is often referred to as an "active cooler", since the coolant temperature is reduced by the airflow moving over the heat exchanger.

A wind turbine type may already include a liquid coolant circuit for cooling heat-dissipating components of the wind turbine, and a liquid-to-air heat exchanger at the exterior of the nacelle. The coolant circuit of such a wind turbine can be adapted with relatively little effort to arrive at an embodiment of the inventive thermal assembly.

The inventive thermal assembly can be constructed in any suitable manner to permit the exclusion of the active cooler. In an embodiment of the invention, the thermal assembly control arrangement comprises a three-port valve with a default position in which the coolant circuit is completed by a main path through the heat exchanger, and a bypass position in which the coolant circuit is completed by a bypass path.

As long as a wind turbine is connected to the grid and is exporting power to the grid, the wind turbine is in a "normal mode" of operation. If wind speed is too high or too low for power production, the wind turbine remains connected to the grid but is placed in an "idling" mode of operation. However, as indicated above, there may be various reasons for disconnecting a wind turbine from the grid. Apart from grid faults, maintenance routines may also require a wind turbine to be taken off-grid. Any of these conditions result in the wind turbine being placed in an off-grid mode.

As long as the wind speed is above a certain cut-in speed, the wind turbine can generate electricity. The expression "self-sustaining mode" can be used to describe the mode of operation of a wind turbine that is off-grid but which continues to generate electricity for its own consumption.

When the wind speed is below the cut-in wind speed, or higher than a safety threshold wind speed, the wind turbine cannot generate electricity. The expression "waiting mode" can be used to describe the mode of operation of a wind turbine that is off-grid and which is waiting for conditions in which it could resume operation.

The three-port valve can be actuated by a motor, for example. The motor may be controlled by a control signal originating from a wind turbine controller. In an embodiment of the invention, the controller actuates the three-port valve to its bypass position when the wind turbine enters an off-grid mode of operation. Once the three-port valve is in its bypass position, the coolant liquid is no longer cooled by the active cooler. This means that, during a self-sustaining mode, the hot components are deliberately allowed to heat the coolant liquid, and the coolant liquid is deliberately routed to avoid the active cooler. The aim of this control approach is to "harvest" the thermal energy given off by the hot components while the wind turbine is off-grid but operational. The heated coolant essentially acts as a kind of "thermal battery". Then, if the wind turbine can no longer generate electricity and must enter a "waiting mode", the thermal energy stored in the coolant liquid can be released again. The effect of this thermal energy harvest and subsequent thermal energy release is to maintain a satisfactory nacelle environment for a longer time.

During self-sustaining mode, the heat-dissipating components are not cooled. As a result, these components heat up beyond a level that is usually tolerated during normal operation, i.e., the temperature of a heat-dissipating component is permitted to rise beyond a normal mode upper threshold during the first off-grid mode. In combination, the hot components and the hot coolant liquid act as a thermal battery. However, to avoid damage to the components, the inventive method includes a step of interrupting the thermal energy harvest in order to stop the temperature increasing further. To this end, the inventive thermal assembly control arrangement comprises a temperature sensor for monitoring the temperature of a heat-dissipating component during the self-sustaining mode and, when the temperature approaches or exceeds an off-grid mode upper threshold, the thermal assembly control arrangement is actuated to briefly include the active cooler in the coolant circuit until the temperature has dropped to an acceptable level. Subsequently, the thermal assembly control arrangement is actuated to again exclude the active cooler from the coolant circuit. This "switching in" and "switching out" of the active cooler can be repeated as often as necessary during the self-sustaining mode in order to harvest as much thermal energy as possible while avoiding excessively high component temperatures. A downtime or still-stand may be prolonged, extending beyond the time in which the nacelle interior can be warmed from the released heat energy that was "harvested" during the self-sustaining mode. Before the wind turbine can resume operation at a later time, it may be necessary to raise the temperature in the nacelle, for example for the purpose of reducing the relative humidity inside the nacelle. This can be done by raising the temperature of the coolant and pumping the heated coolant through the circuit. To this end, the thermal assembly comprises a heater, for example an electric heater, arranged to direct heat at the coolant circuit. The heater can be powered by a backup battery, a diesel generator, or any other suitable power supply. A wind turbine will generally be designed to include such a heater arrangement. The inventive thermal assembly can exploit the functionality of such a heater arrangement. In an embodiment, the inventive method includes a step of actuating the heater during the self-sustaining mode to further raise the temperature of the coolant. In an embodiment, during the self-sustaining mode, the heater is only turned on if there is sufficient power available after supplying the other consumer loads in the wind turbine. Local consumers might be any of a wind turbine computer and control system, a communication system connected to a park controller, etc.

The ability to "harvest" thermal energy and to later release this into the nacelle interior can mean that an auxiliary heater and its power supply can have a smaller specification, i.e., its capacity may be lower than an auxiliary heater of a comparable wind turbine. For example, instead of having to provide a relatively large-capacity heater and a corresponding backup battery, these may be realized to have a lower capacity.

To this end, the inventive method comprises a step of monitoring a nacelle environment value and activating the heater to heat the coolant when the environment value approaches a threshold level. A nacelle environment value can be the temperature in the interior of the nacelle. Alternatively, or in addition, a nacelle environment value can be the relative humidity in the nacelle interior.

BRIEF DESCRIPTION

Some of the embodiments will be described in detail, with reference to the following figures, wherein like designations denote like members, wherein.

DETAILED DESCRIPTION

Figure 1:
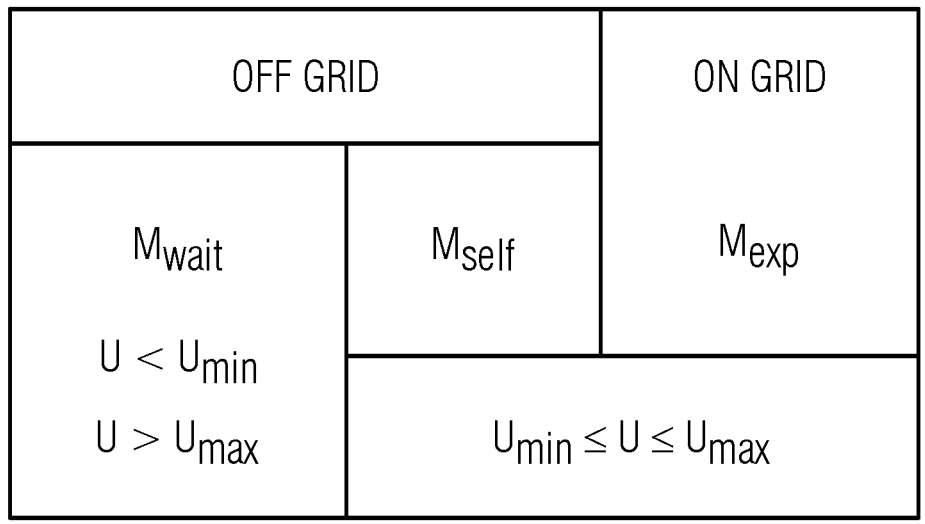
FIG. 1 illustrates the various modes of operation of a wind turbine.

FIG. 1 illustrates various modes of operation of a wind turbine of the type discussed herein. When the wind speed is within a certain range (between a lower limit venin and an upper limit $v_{max}$) the wind turbine can generate electricity. If the wind turbine is connected to the grid, it can export that electricity to the grid. When both conditions apply, the wind turbine is in its on-grid mode or "normal" mode $M_{exp}$ of operation.

If the wind speed is greater than the upper limit $v_{max}$, the wind turbine is put into an idling mode in order to avoid damage, and waits for weather conditions to improve.

If the wind turbine is disconnected from the grid even though the wind speed lies within the range $v_{min}$-$v_{max}$, or if the wind turbine is idling, the wind turbine is in a mode $M_{self}$ in which it generates electricity for its own needs. In this mode, the wind turbine is referred to as a "self-sustaining turbine" or SST, and this mode of operation is referred to as "self-sustaining mode". If the wind speed is less than the lower limit $v_{min}$, the wind turbine is put into a mode $M_{wait}$ in which it waits for the wind to pick up.

The inventive method provides a way of improving the conditions inside the nacelle when the wind turbine is off-grid or idling, by taking measures to avoid problems in case the wind speed should drop below the minimum cut-in speed. The method is explained with the aid of the following diagrams, which illustrate an embodiment of the inventive thermal assembly 1 for a wind turbine.

Figure 2:
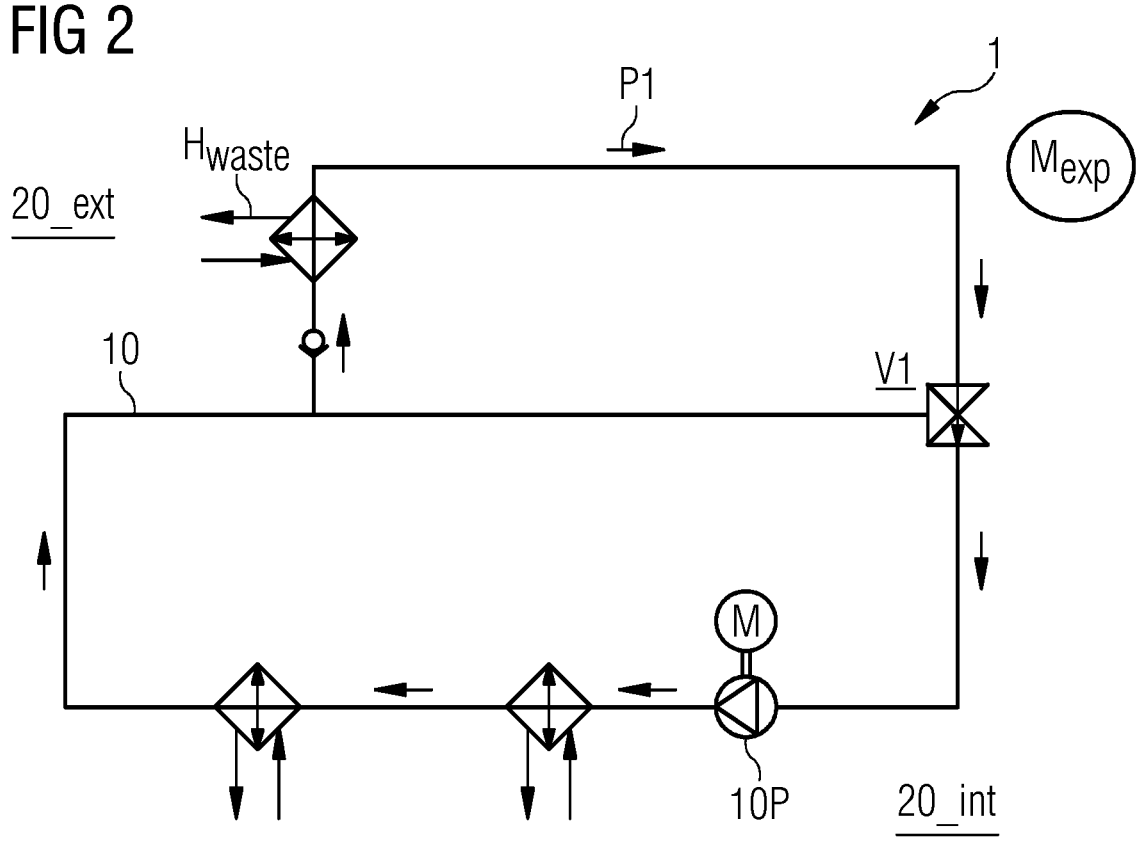
FIG. 2 shows an embodiment of the inventive thermal assembly during a normal mode of operation.

As shown in FIG. 2, the thermal assembly 1 includes a motor-driven coolant pump 10P that circulates a liquid coolant through pipes or ducts of a coolant circuit 10 arranged in or near various components. Heat transfer between hot components is done by equipping these with passive heat exchangers 23X, 24X and including these in the coolant circuit 10. The coolant liquid (e.g., a water/glycol mixture) is then conveyed to an active cooler 11, for example a liquid-to-air heat exchanger 11 arranged at the outside 20_ext of the nacelle. From the active cooler 11, the liquid coolant is returned to the pump 10P to complete the circuit 10.

The thermal assembly 1 includes a three-port valve 3PV that can be actuated by a controller (not shown). When the three-port valve 3PV is in a first position V1, the active cooler 11 is included in the coolant circuit 10 and coolant is circulated in this main path P1 by the coolant pump 10P. The main path P1 is the default coolant path during normal mode $M_{exp}$ when the wind turbine is operational and exporting electricity to the grid.

Figure 3:
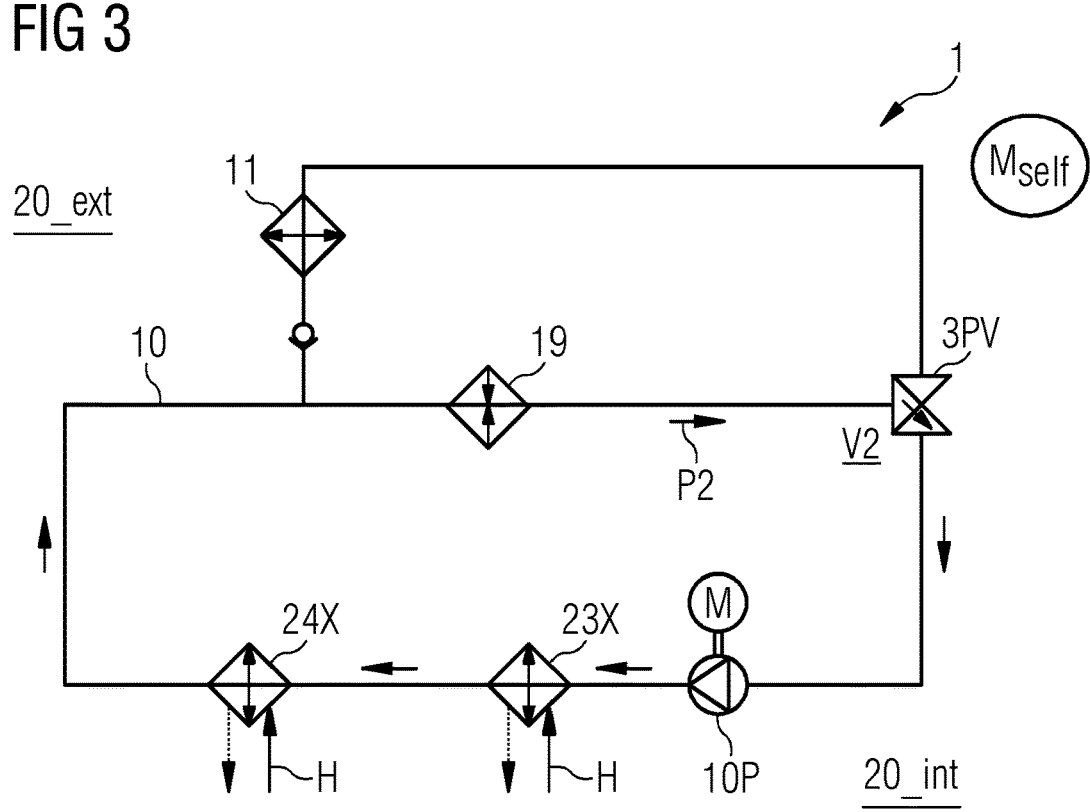
FIG. 3 shows the thermal assembly of FIG. 2 during an off-grid mode of operation.
Figure 5:
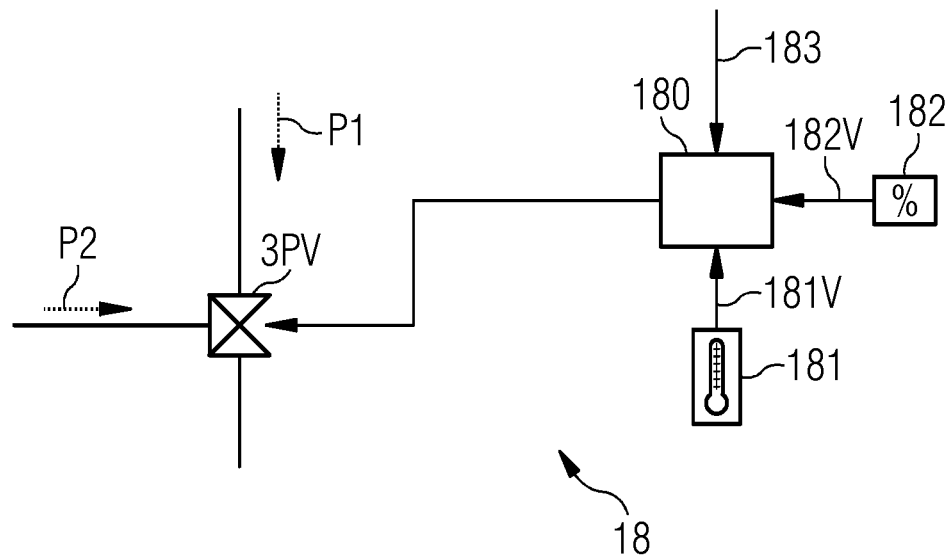
FIG. 5 shows a control arrangement of an embodiment of the inventive thermal assembly.

FIG. 3 shows the thermal assembly 1 during an off-grid mode $M_{self}$ of operation in which the wind turbine is generating electricity for its own requirements. In this state, the three-port valve 3PV is placed in a second position V2 that excludes the active cooler 11 from the coolant circuit 10. Here, liquid coolant is returned to the coolant pump 10P along a bypass path P2. In this state, the coolant does not pass through the active cooler 11, and its temperature cannot be reduced by the active cooler 11. Instead of cooling the heat-dissipating components, the dissipated heat H is stored in the coolant circuit 10 of the thermal assembly 1. Since the pump 10P is still active, the coolant liquid is progressively heated by the hot components. The coolant liquid is effectively being used to store the thermal energy H. The temperature of the components is allowed to rise beyond a normal mode upper threshold. However, the temperature of the components may reach an off-grid mode upper threshold, in which case the coolant liquid may need to be routed through the active cooler 11. As shown in FIG. 5, one of several temperature sensors 181 can report a temperature value 181V of a heat-dissipating component, for example the temperature in a power converter. During normal mode $M_{exp}$ of operation, the thermal assembly 1 is regulated to ensure that the temperature of the component does not exceed a normal mode upper threshold $T_{max}$. During the self-sustaining mode $M_{self}$ of operation, the temperature of the component is allowed to rise beyond the normal mode upper threshold $T_{max}$, towards an off-grid mode upper threshold $T_{max\_self}$. If the reported temperature 181V is greater than such an off-grid mode upper threshold $T_{max\_self}$, the heat exchanger 11 is temporarily included in the coolant circuit 10 by returning the three-port valve 3PV to its first positon V1. The temperature of the coolant liquid—and the temperature of the hot component—can then be lowered by the active cooler 11. When the temperature of the component has been lowered by a sufficient amount, the heat exchanger 11 is once again excluded from the coolant circuit 10 by placing the three-port valve 3PV into its bypass position V2. These adjustments can be made repeatedly as required, as long as the wind turbine is being operated in this self-sustaining off-grid mode $M_{self}$. Appropriate threshold temperature values can be defined for each heat-dissipating component. Alternatively, a single "normal mode" upper threshold and a single off-grid mode upper threshold $T_{max\_self}$ may be identified that best represent the acceptable temperature levels for the heat-dissipating components of the wind turbine.

The diagram also indicates an electric heater 19. This can be turned on to further raise the temperature of the coolant fluid during the self-sustaining mode $M_{self}$ of operation. As explained above, the heater 19 is only turned on if the wind turbine is generating more power than it needs for its own requirements.

Figure 4:
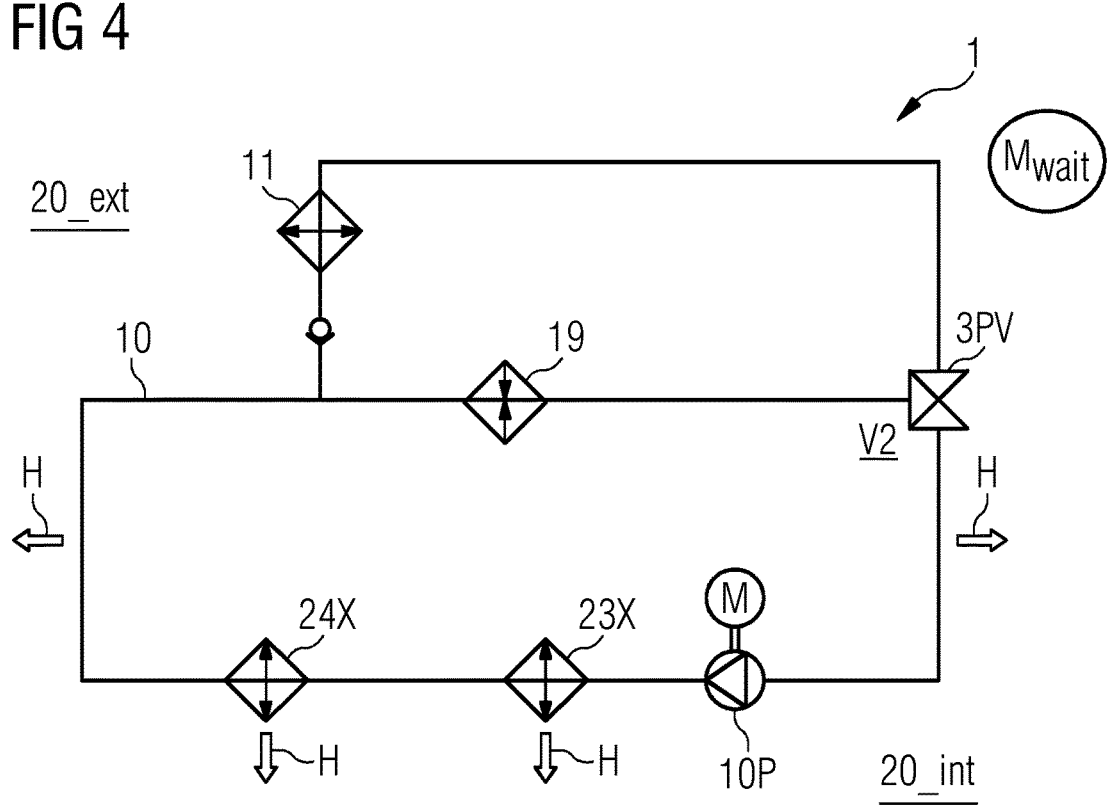
FIG. 4 shows the thermal assembly of FIG. 2 during a further off-grid mode of operation.

FIG. 4 shows the thermal assembly 1 during an off-grid mode $M_{wait}$ of operation in which the wind turbine is unable to generate electricity for its own requirements. In this state, the internal power consumption is decreased to a minimum in order to avoid unnecessary depletion of the wind turbine's backup power supply. Since the coolant pump is not required in this state, it is turned off. This state follows a state $M_{self}$ in which the thermal assembly 1 has stored heat energy H from the operational components as described in FIG. 3 above. This "stored heat energy" H is gradually released as the coolant temperature drops. The gradual release of heat H into the nacelle interior 20_int reduces the rate at which the nacelle temperature drops, and also reduces the rate at which the relative humidity increases.

As indicated in FIG. 5, one of several temperature sensors 181 can be used to continually report a temperature in the nacelle interior 20_int. If this drops to a minimum threshold, an electric heater 19 can be turned on to raise the temperature of the coolant fluid. To circulate the heated fluid, the coolant pump is switched on again. A controller 180 can be a dedicated controller for the thermal assembly 1, or can be the wind turbine controller. In this exemplary embodiment, the controller 180 can also monitor the relative humidity 182V reported by a hygrometer 182, and can generate control signals accordingly, for example a control signal to actuate a heater if the relative humidity 182V is too high prior to re-connecting the wind turbine to the grid.

Figure 6:
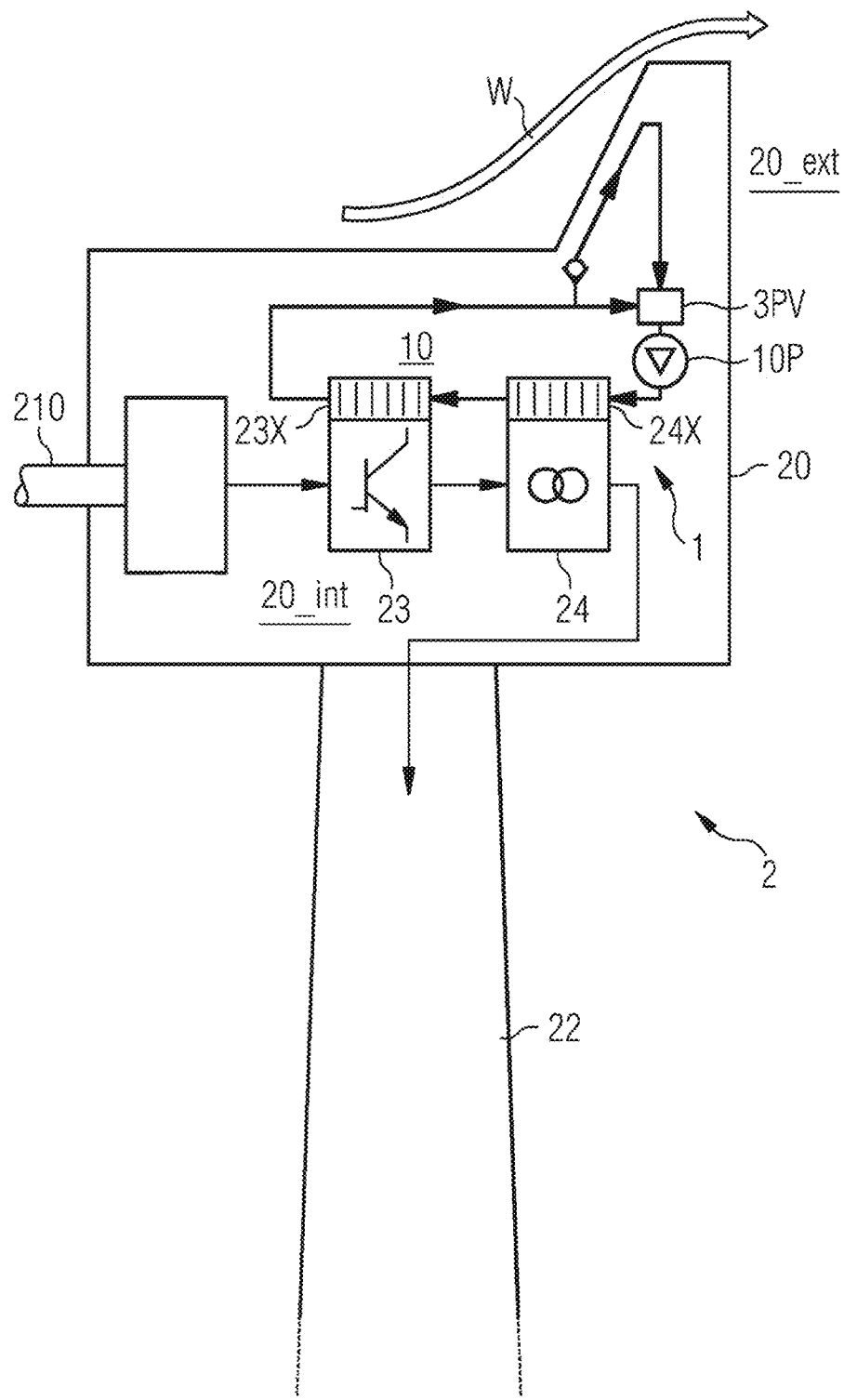
FIG. 6 shows a wind turbine with an embodiment of the inventive thermal assembly.

FIG. 6 shows a simplified schematic of a wind turbine 2 with a nacelle 20 mounted atop a tower 22. Various components 23, 24 of the wind turbine 2 generate significant quantities of heat during operation. The diagram indicates a power converter 23 and a transformer 24 by way of example. These and/or other heat-dissipating components are cooled by the coolant circuit. To this end, a motor-driven pump 10P ensures that the liquid coolant is circulated through pipes or ducts connected to heat exchangers 23X, 24X of the heat-dissipating components 23, 24. The heated liquid continues to an active cooler 11 that extends to the nacelle exterior 20_ext, and shaped to allow the heated coolant to be cooled by an airflow W moving over the nacelle 20. The cooled liquid is returned to the pump 10P to complete the circuit. During the self-sustaining mode $M_{self}$ of operation, the active cooler 11 is excluded from the coolant circuit 10 so that heat energy given off by the hot components 23, 24 is harvested and stored in the coolant instead of being given off to the exterior 20_ext as waste heat. During the self-sustaining mode $M_{self}$, the temperature of a component 23, 24 is allowed to rise above the upper limit that would usually apply during a normal mode $M_{exp}$ when the wind turbine is operational and exporting electricity to the grid.

Figure 7:
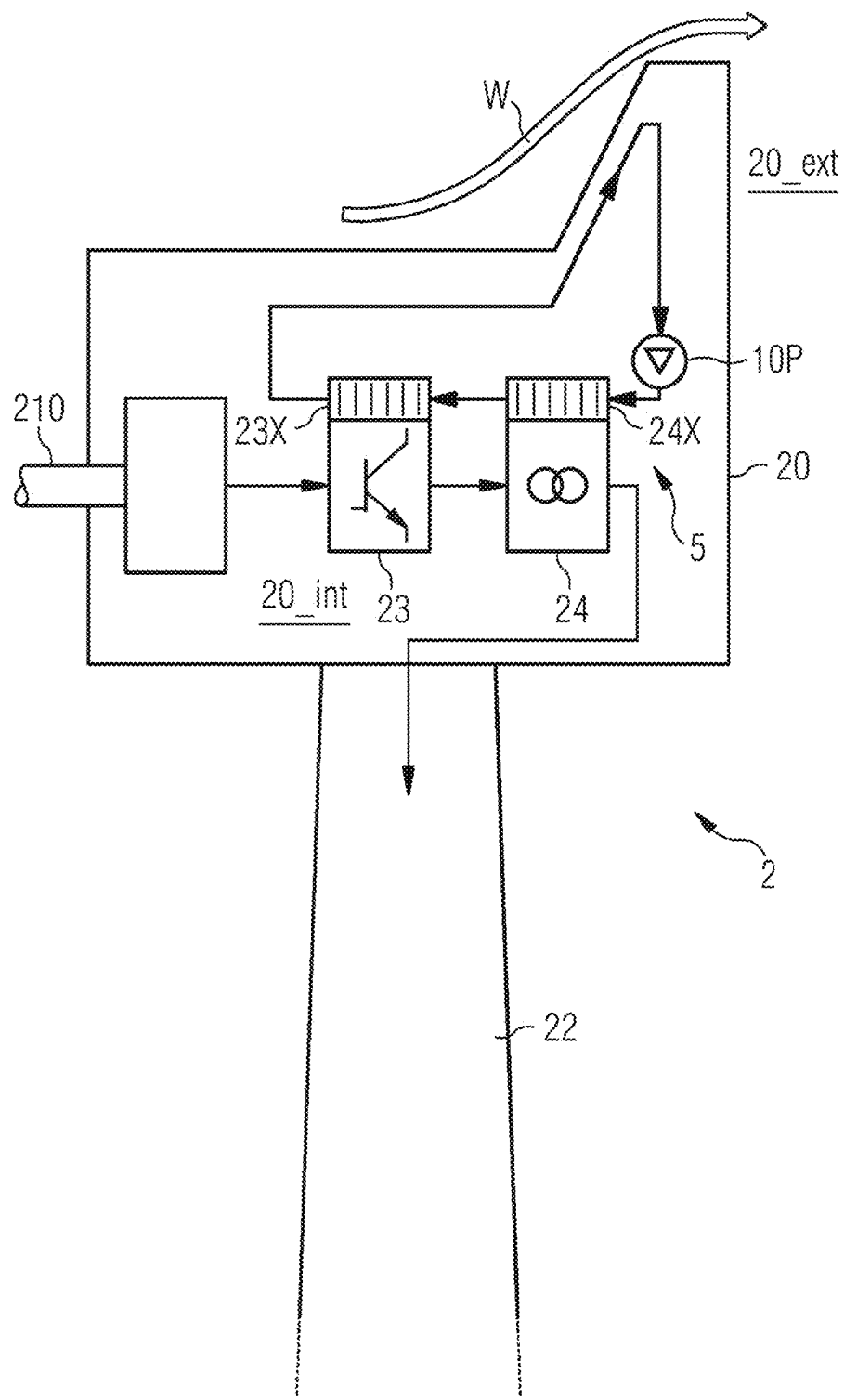
FIG. 7 illustrates temperature development for the wind turbine of FIG. 6.

FIG. 7 shows a conventional art wind turbine cooling circuit 5. Similar to FIG. 6 above, the diagram indicates a power converter 23 and a transformer 24 that are cooled by the cooling circuit 5 when the wind turbine 2 is in operation. When the wind turbine 2 is in a normal mode of operation $M_{exp}$ (exporting electricity to the grid), the cooling circuit 5 acts to cool all heat-dissipating components 23, 24. These heat-dissipating components 23, 24 are cooled in the same manner when the wind turbine 2 is in a self-sustained mode $M_{self}$ (generating electricity while disconnected from the grid). No attempt is made to store the heat for later use. Therefore, when the wind turbine 2 cannot generate electricity, the temperature inside the nacelle 20 can drop to a very low level, for example below freezing. At some time, it is permitted to connect the wind turbine 2 to the grid again. If all internal components are rated for extreme cold and high humidity, the turbine may be started without an initial heating and drying phase. If not, before the wind turbine can resume normal operation, it is necessary to turn on a heater to raise the temperature in the nacelle interior 20_int. In this time, which can be considerable, the wind turbine 2 is unable to export electricity.

Figure 8:
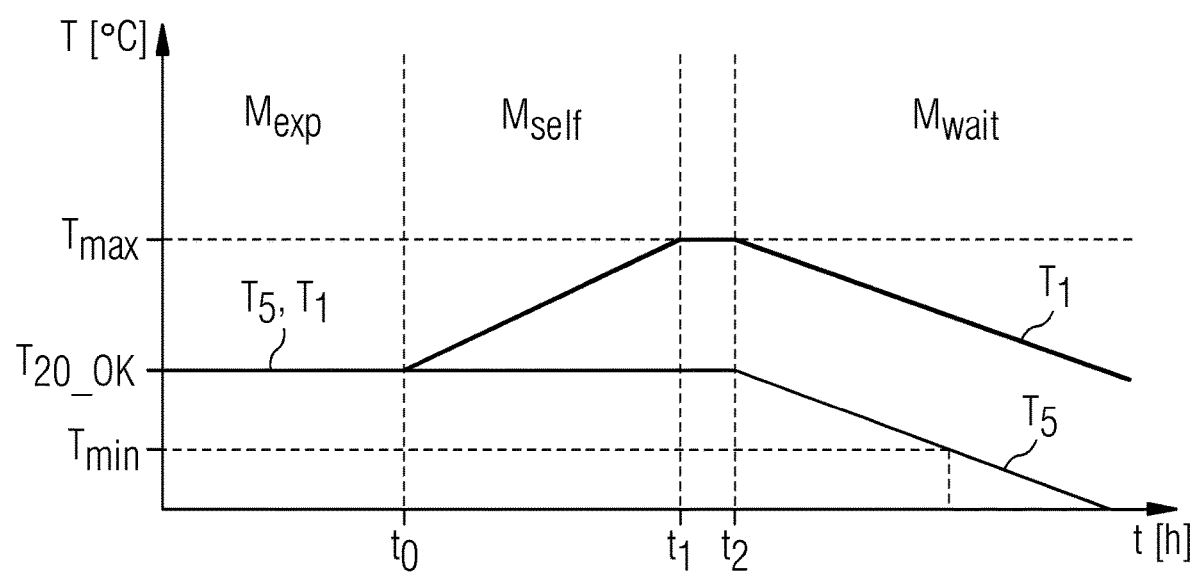
FIG. 8 shows a wind turbine with a conventional art cooling arrangement.

FIG. 8 illustrates an exemplary temperature development T1 in the nacelle interior of the wind turbine of FIG. 6 (cooled by the inventive thermal assembly 1), and an exemplary temperature development T5 in the nacelle interior of the wind turbine of FIG. 8 (cooled by the conventional art cooling arrangement 5). Up until time to, the wind turbine is in a normal mode $M_{exp}$ of operation, exporting power to the grid. In each case, the thermal assembly 1 and the conventional art cooling arrangement 5 ensure that the components are cooled, and the nacelle interior temperature can be at a nominal level $T_{20\_OK}$. At time t0, the wind turbine goes off-grid and enters a self-sustaining mode $M_{self}$. At time $t_2$, the wind turbine leaves the self-sustaining mode $M_{self}$ and enters a wait mode $M_{wait}$. The temperature development T5 in the nacelle interior of the wind turbine cooled by the conventional art cooling arrangement is maintained at the low level $T_{20\_OK}$ during the self-sustaining mode $M_{self}$ and drops steadily during the wait mode $M_{wait}$. Once the temperature has dropped below a minimum threshold $T_{20\_min}$, it will be necessary to actively heat the nacelle interior before re-connecting the wind turbine to the grid. This can take a long time, during which the wind turbine is unable to export power to the grid.

In contrast, the temperature development T1—in the nacelle interior of the wind turbine that is equipped with the inventive thermal assembly—is allowed to rise during the self-sustaining mode $M_{self}$ by excluding the active cooler and allowing the heat to accumulate in the coolant liquid. When the wind turbine enters the wait mode $M_{wait}$, the harvested heat is released into the nacelle interior. It takes a significantly longer time for the nacelle temperature to drop to the minimum threshold $T_{20\_min}$. It may be that the wind turbine is allowed to be re-connected to the grid before this point in time, in which case the wind turbine can directly resume operation, since it is not necessary to heat the nacelle interior.

The diagram also illustrates a further control step. At time $t_1$, the temperature of a component may reach an upper threshold as explained above, and the nacelle interior is warmed to a temperature $T_{20\_max}$. To avoid a further increase in temperature of the component, the three-port valve 3PV is actuated to include the active cooler 11 in the coolant circuit 10.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of operating a wind turbine in an off-grid mode, the wind turbine comprising a thermal assembly having an external liquid-to-air heat exchanger arranged to lower a temperature of a liquid coolant in a coolant circuit, the coolant circuit arranged to convey the liquid coolant to a number of heat-dissipating components in a nacelle interior during operation of the wind turbine, the method comprising:
   excluding an external liquid-to-air heat exchanger from the coolant circuit;
   storing thermal energy dissipated by the number of heat-dissipating components during a first off-grid mode during which the wind turbine is operated to generate power for its own consumption; and
   releasing the stored thermal energy to the nacelle interior during a second off-grid mode during which the wind turbine does not generate power.

2. The method according to claim 1, wherein a temperature of the heat-dissipating components is permitted to rise beyond a normal mode upper threshold during the first off-grid mode.

3. The method according to claim 1, comprising including the external liquid-to-air heat exchanger in the coolant circuit during the first off-grid mode while a temperature of a heat-dissipating component exceeds an off-grid mode upper threshold.

4. The method according to claim 3, wherein the external liquid-to-air heat exchanger is again excluded from the coolant circuit when the temperature of the heat-dissipating component drops below the off-grid mode upper threshold.

5. The method according to claim 1, comprising monitoring a nacelle environment value and operating a heater to heat the coolant when the environment value approaches a threshold level.

6. The method according to claim 5, wherein the nacelle environment value comprises a nacelle interior temperature and/or nacelle interior relative humidity.

7. The method according to claim 1, comprising using surplus power generated during the first off-grid mode to operate a heater.

8. A thermal assembly of a wind turbine, comprising:
   an external liquid-to-air heat exchanger arranged to lower a temperature of a liquid coolant in a coolant circuit, the coolant circuit arranged to convey the liquid coolant to a number of heat-dissipating components in the nacelle interior during operation of the wind turbine; and
   a thermal assembly control arrangement configured to exclude the external liquid-to-air heat exchanger from the coolant circuit during an off-grid mode when the wind turbine is operated using the method according to claim 1.

9. The thermal assembly according to claim 8, wherein the thermal assembly control arrangement comprises a controller to actuate the three-port valve to its bypass position when the wind turbine enters an off-grid mode of operation.

10. The thermal assembly according to claim 8, wherein the thermal assembly control arrangement comprises a temperature sensor for monitoring the temperature of a heat-dissipating component.

11. The thermal assembly according to claim 8, comprising a heating arrangement with an electric heater arranged to raise the temperature of the liquid coolant in the coolant circuit.

12. The wind turbine comprising a thermal assembly according to claim 8.

13. A wind turbine according to claim 12, wherein the external liquid-to-air heat exchanger is arranged at the exterior of the nacelle.

14. The method according to claim 1, wherein, in the second off-grid mode, a coolant pump arranged in the coolant circuit is turned off.

15. The thermal assembly according to claim 8, wherein the thermal assembly control arrangement comprises a three-port valve with a default position in which the coolant circuit is completed by a main path through the external liquid-to-air heat exchanger, and a bypass position in which the coolant circuit is completed by a bypass path.

\* \* \* \* \*